United States Patent [19]

Layne

[11] 4,349,992
[45] Sep. 21, 1982

[54] BUMPER SEAL

[76] Inventor: Richard C. Layne, 1312 King Ave., Apt. 4, Columbus, Ohio 43212

[21] Appl. No.: 139,230

[22] Filed: Apr. 11, 1980

[51] Int. Cl.³ .......................... E06B 7/22; E06B 1/56
[52] U.S. Cl. ............................................. 52/173 DS
[58] Field of Search .......................... 52/173 DS, 716; 135/5 R; 14/69.5, 71.5; 49/485, 489

[56] References Cited

U.S. PATENT DOCUMENTS

| | | | |
|---|---|---|---|
| 2,400,470 | 5/1946 | Spraragen | 49/485 X |
| 3,184,773 | 5/1965 | Breneman | 14/69.5 |
| 3,352,314 | 11/1967 | Frommelt et al. | 52/173 DS |
| 3,375,625 | 4/1968 | Edkins et al. | 52/173 DS |
| 3,407,536 | 10/1968 | Nystrom | 49/489 X |
| 3,934,380 | 1/1976 | Frommelt et al. | 52/173 DS |
| 3,935,684 | 2/1976 | Frommelt et al. | 52/173 DS |
| 4,020,607 | 5/1977 | Bjervig | 52/173 DS |
| 4,038,792 | 8/1977 | McGuire et al. | 52/173 DS |
| 4,062,157 | 12/1977 | Potthoff | 52/173 DS |
| 4,209,869 | 7/1980 | Trine et al. | 14/69.5 |
| 4,213,279 | 7/1980 | Layne | 52/173 DS |

FOREIGN PATENT DOCUMENTS 2115194 10/1971 Fed. Rep. of Germany ........ 49/485
944269 12/1963 United Kingdom ................ 49/485

Primary Examiner—J. Karl Bell
Attorney, Agent, or Firm—Frank H. Foster

[57] ABSTRACT

A bumper seal to be disposed on the exterior of a building at the lower edge of a doorway and against which a truck or trailer can back to seal its deck edge against the building. It comprises a resiliently yieldable and compressible sealing body member extending transversely below the opening between two bumper blocks disposed at opposite sides of the opening. The seal is removably mounted so it can be replaced when worn. In addition, it is so mounted that a dock plate can be positioned thereover and will interfit with its mounting means to prevent displacement of the plate. Also, the sealing body is ventilated to facilitate compression and expansion.

4 Claims, 5 Drawing Figures

BUMPER SEAL

BACKGROUND AND SUMMARY OF THE INVENTION

Bumper seals are commonly used at the lower edges of doorways of buildings against which trucks or trailers back during loading or unloading of the vehicle. They usually include a compressible body to provide a seal which is difficult to mount initially and to remove for replacement. They usually have been of relatively expensive construction consisting of several molded interfitting parts, expensive to produce, to assemble and to mount. Also, usually the lack of ventilation for these members interferes with each in compression and expansion.

The present invention overcomes these disadvantages by having a body of resiliently compressible material enclosed within a weatherproof cover. However, means is provided for ventilation, as the body is compressed or expanded, to facilitate these actions. Mounting means is provided for removably mounting the seal body below the doorway opening to facilitate removal and replacement when worn. In addition, the mounting means is arranged to cooperate with a dock plate, when it is positioned thereover, to prevent displacement of the plate during movement thereover of forklift trucks or other trucks used in loading and unloading the vehicle backed against the bumper seal.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
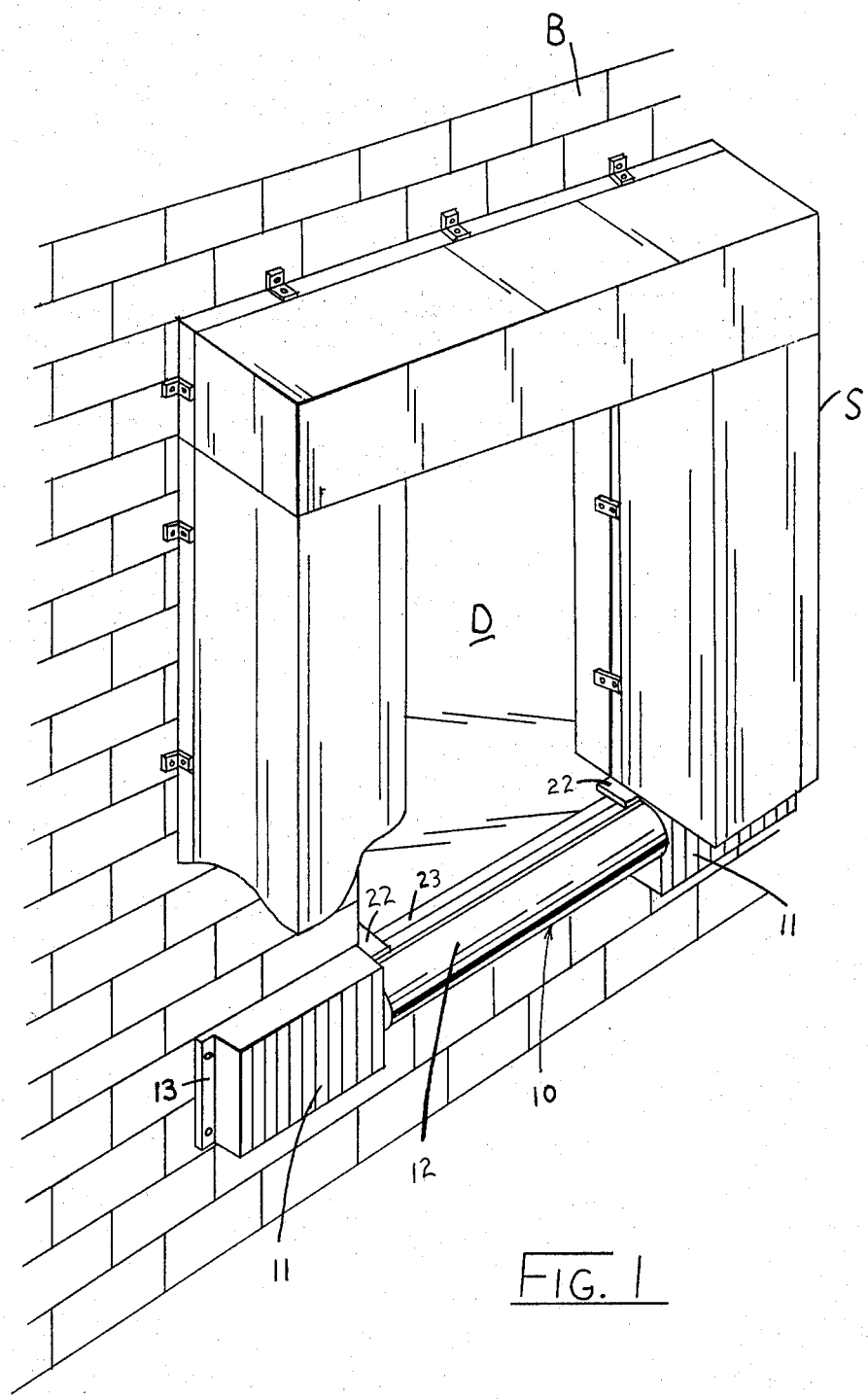
FIG. 1 is a perspective view, partly broken away, showing a bumper seal embodying this invention positioned below a doorway.

With reference to FIG. 1, a building is shown at B with a doorway opening D, which has a dock seal S associated therewith that may be of any suitable form and has vertical sections at each side of the opening along with a horizontal header section at the top edge of the opening. The bumper seal 10 of this invention is disposed across the lower edge of the opening so as not to interfere with the vertical sections of the dock seal S. This seal, as shown in FIG. 2, is so disposed that the rear edge of the deck of a truck or trailer T will contact therewith and compress it to produce a seal when the vehicle backs into place in association with the doorway opening D.

Specifically the bumper seal, designated generally by the numeral 10, comprises the bumper blocks 11 disposed at opposite sides of the openings, below the vertical sections, of the dock seals with the compressible seal 12 extending therebetween below the opening. The bumper blocks 11 will be of molded rubber or plastic and will be semi-rigid so that they will limit compression of the vertical sections of the dock seal S which will be yieldable or compression. The blocks may be carried by plates 13 bolted to the outer face of the building.

Figure 5:
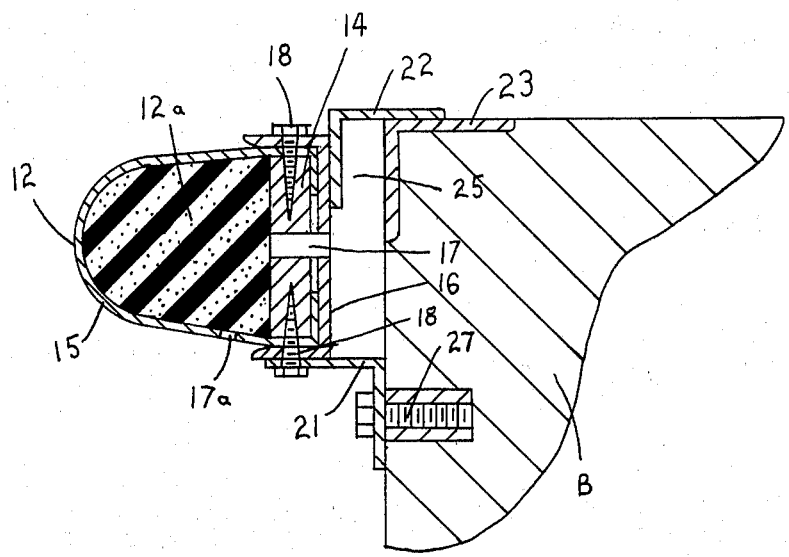
FIG. 5 is an enlarged transverse vertical sectional view taken along line 5—5 of FIG. 4 through the seal.

The specific structure of the seal 12 is shown best in FIG. 5. It includes a body 12a of resiliently yieldable or compressible material, such as polyurethane foam, which extends between the two laterally-sealed bumper blocks 11. This body 12a is convexly curved at its outer edge and has a flat inner mounting surface that is adhered to or otherwise secured to the flat outer face of strip 14 of wood or rigid plastic. The body 12a is completely covered with a waterproof covering 15 of flexible sheet material, such as high-abrasion, vinyl-coated nylon cloth. This cover 15 is wrapped completely around the body 12a and its edges are inturned and overlapped with the flat inner surface of the strip 14 and may be stapled in place. This mounting strip 14 can be readily slipped into and out of a metal mounting channel 16 which opens outwardly. Thus, the member 12, when it becomes worn, can be removed from the channel 16 and be replaced with a new one. For ventilation, the strip 14 and the channel 16 are preferably provided with sets of aligning openings 17 spaced longitudinally therealong. Normally, the strip 14, and the covered seal body 12a carried thereby, are mounted in the channel by removable screws 18 which are passed through openings in the flanges of the channel 16 and threaded into the edges of the strip 14. Ventilation may also be provided by openings 17a in the cover 15.

Figure 2:
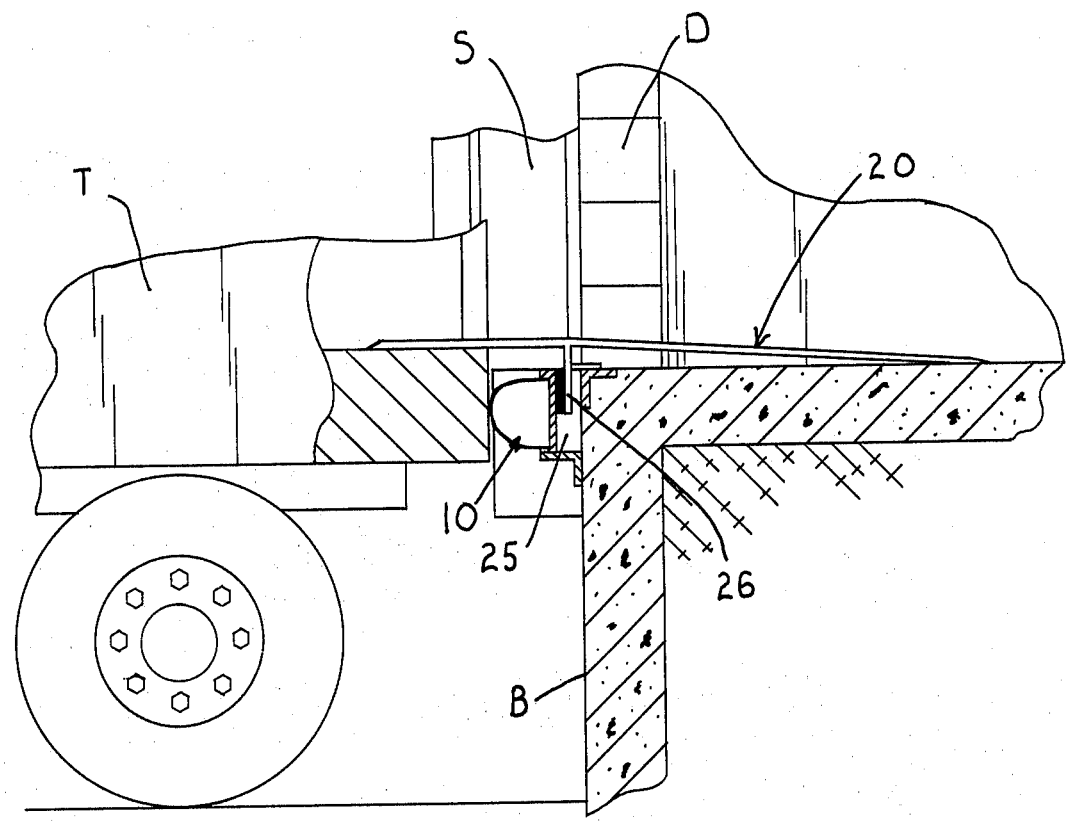
FIG. 2 is a schematic view, mainly in vertical section showing the rear edge of a truck or trailer deck backed against the bumper seal.
Figure 3:
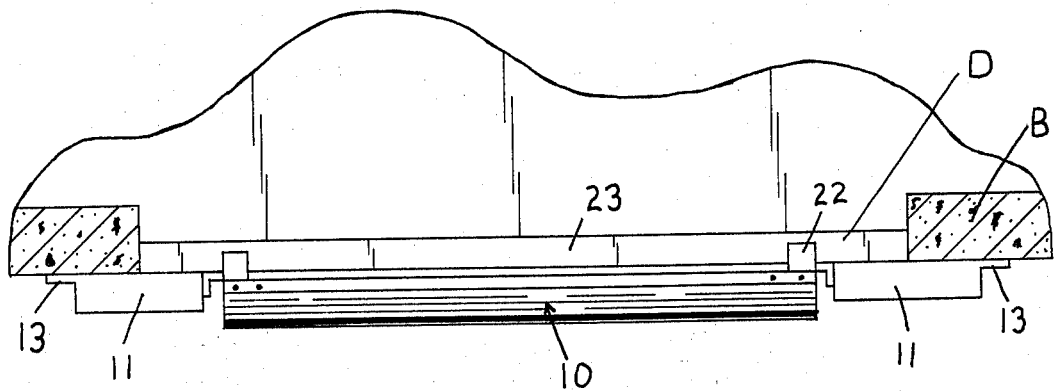
FIG. 3 is a view mainly in plan showing the bumper seal below the doorway.
Figure 4:
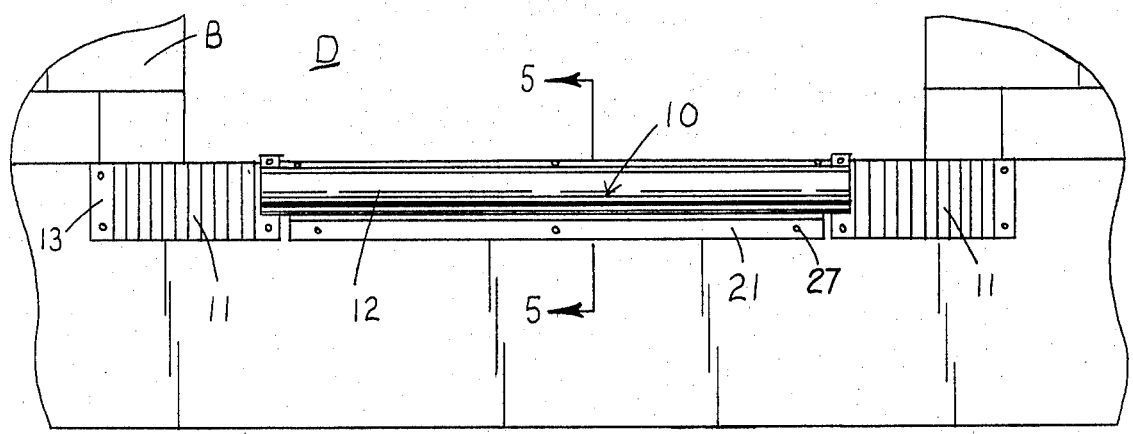
FIG. 4 is a face view of the bumper seal mounted below the doorway.

The channel 16 is used in mounting the seal 12 below the opening for cooperation with a dock plate 20 which, as shown in FIG. 2, is provided to bridge the space between the vehicle deck and the floor of the building, the plate extending over the compressed bumper seal 10 when the vehicle is in place. The channel is carried by lower angle 21 which extends from block to block. This angle has a vertical flange, bolted to the face of the building by bolt units 27, and an upper outwardly-extending horizontal flange on which the lower flange of the channel 16 rests. The lower screws 18 are passed upwardly through the flange of the angle 21 to also connect the angle to the channel. Upper angle brackets 22 are also provided at the respective ends of the channel 16 to secure it to the building. Each of these brackets has a depending flange which is welded or otherwise secured to the inner face of the channel 16 and an inwardly-extending horizontal flange which may overlap and rest on an angle 23, provided in the floor at the bottom edge of the doorway, preferably being welded thereto. Thus, there will be a vertical space or slot 25, formed between the rear surface of the channel 16 and the face of the building at the lower edge of the doorway, and this slot will extend substantially completely across the doorway.

The dock plate 20, to be positioned over the joint between the vehicle deck and building floor or deck, will be of the usual construction except that intermediate its inner and outer edges, it is provided with a single depending retaining lug 26 or a plurality of such lugs spaced transversely of the plate. This lug or these lugs will drop into the slot 25 when the plate 20 is properly positioned. The lug or lugs will be located laterally within the brackets 22 and will engage therewith to prevent lateral movement of the plate. Thus, as fork-lift or other cargo-handling trucks, move back-and-forth over the plate 20, outward or inward displacement of the plate 20 will be precluded by the lug or lugs 26 cooperating with the walls or the slot 25.

It will be apparent that this invention provides a simple, inexpensive yet effective bumper seal. The compressible seal body thereof is mounted so it can be readily removed and replaced. Although, it is covered for weatherproofing, the cover is ventilated to facilitate compression and expansion of the resiliently compressible body. The seal is mounted below the doorway for cooperation with a dock plate to prevent displacement of that plate. Both laterally and in or out relative to the vehicle.

Having thus described this invention what is claimed is:

1. A bumper seal for mounting along the lower edge of a loading dock for engaging a vehicle bumper, said bumper seal comprising:
   (a) at least one bumper block formed of a relatively semi rigid, and relatively unyieldable material and positioned along the lower edge of a loading dock to engage and oppose the force applied by a vehicle bumper;
   (b) a mounting strip mounted along said lower edge in alignment with said bumper block, said mounting strip formed with an upwardly opening slot for receipt of a dock plate lug and for retaining it against substantial movement upwardly or outwardly from said dock; and
   (c) a relatively yieldable and compressable sealing body mounted to said mounting strip and extending longitudinally along it for sealingly engaging said vehicle bumper.

2. A bumper seal in accordance with claim 1 wherein said bumper seal further comprises a second bumper block spaced horzontally from the first bumper block and having said sealing body extending between said bumper blocks.

3. A bumper seal in accordance with claim 2 wherein a longitudinal channel is formed on the outwardly facing portion of said mounting strip for receipt of said sealing body.

4. A bumper seal in accordance with claim 3 wherein said sealing body comprises an open celled, foam body covered by a water impervious cover and wherein vent openings are provided through said mounting strip at said channel for ventilation of air in said sealing body upon its compression and expansion.

* * * * *